INVENTOR
I. W. SANDBERG
BY R. O. Nimtz
ATTORNEY

VOLTAGE INVERSION
NEGATIVE IMPEDANCE
CONVERTER

CURRENT INVERSION
NEGATIVE IMPEDANCE
CONVERTER

INVENTOR
I. W. SANDBERG
BY R. O. Nimtz
ATTORNEY

June 26, 1962 I. W. SANDBERG 3,041,557

ACTIVE MULTIPORT NETWORKS

Filed March 3, 1961 3 Sheets-Sheet 3

INVENTOR
I. W. SANDBERG

BY R. O. Nimtz

ATTORNEY

United States Patent Office 3,041,557
Patented June 26, 1962

3,041,557

ACTIVE MULTIPORT NETWORKS

Irwin W. Sandberg, Springfield, N.J., assignor to Bell Telephone Laboratories, Incorporated, New York, N.Y., a corporation of New York Filed Mar. 3, 1961, Ser. No. 93,063
11 Claims. (Cl. 333—80)

This invention relates to signal transmission networks and, more particularly, to active unbalanced $n$-port networks without inductors in which all of the driving point and transfer parameters may be preselected without restriction.

In many signal transmission networks, it is often desirable to obtain certain driving-point and transmission parameters without the use of inductors, particularly at low frequencies. This arises from the fact that inductors used at these frequencies are generally large, cumbersome, expensive, and are usually far from ideal components. Resistors and capacitors, on the other hand, are small, inexpensive and much more nearly ideal components. A large amount of work has therefore been done in synthesizing networks having desired parameters but having no inductors. In the copending application of the present applicant, Serial Number 66,755, filed November 2, 1960, for example, there is disclosed a structure for realizing all of the driving-point and transfer parameters of an $n$-port network without the use of inductors. This structure, however, requires the use of a number of balanced resistive and capacitive networks and hence involves the careful selection of matched components for its realization.

It is an object of the present invention to synthesize $n$-port transmission networks for which all of the parameters may be arbitrarily chosen, which includes no inductors, and which includes only unbalanced networks with a common reference node.

In accordance with the present invention, a generalized multi-terminal transmission network is obtained, including only resistors, capacitors and negative impedance converters, in which all of the parameters may be preselected without restriction. The network comprises at least $n$ negative impedance converters and a $(3n+1)$ terminal subnetwork, including only resistors and capacitors, interconnecting the $n$ external terminals to the $n$ inputs and the $n$ outputs of the negative impedance converters. The remaining terminal is the common reference node for all the other terminals as well as for the negative impedance converters.

In the general case, the $(3n+1)$ terminal subnetwork includes two-terminal impedances, each including only resistors and capacitors, by means of which each of the $n$ external terminals is connected to each negative impedance converter input and each of the $n$ external terminals is also connected to each negative impedance converter output. Similar impedances connect each negative impedance converter input to each negative impedance converter output. A two-terminal impedance is also connected between each of the $3n$ terminals and the common reference terminal. The parameters of the individual resistance-capacitance networks are chosen according to the method to be described below so as to realize any arbitrarily chosen set of over-all network parameters.

These and other objects and features, the nature of the present invention and its various advantages, will be more readily understood upon consideration of the attached drawings and the following detailed description of the drawings.

Figure 1:
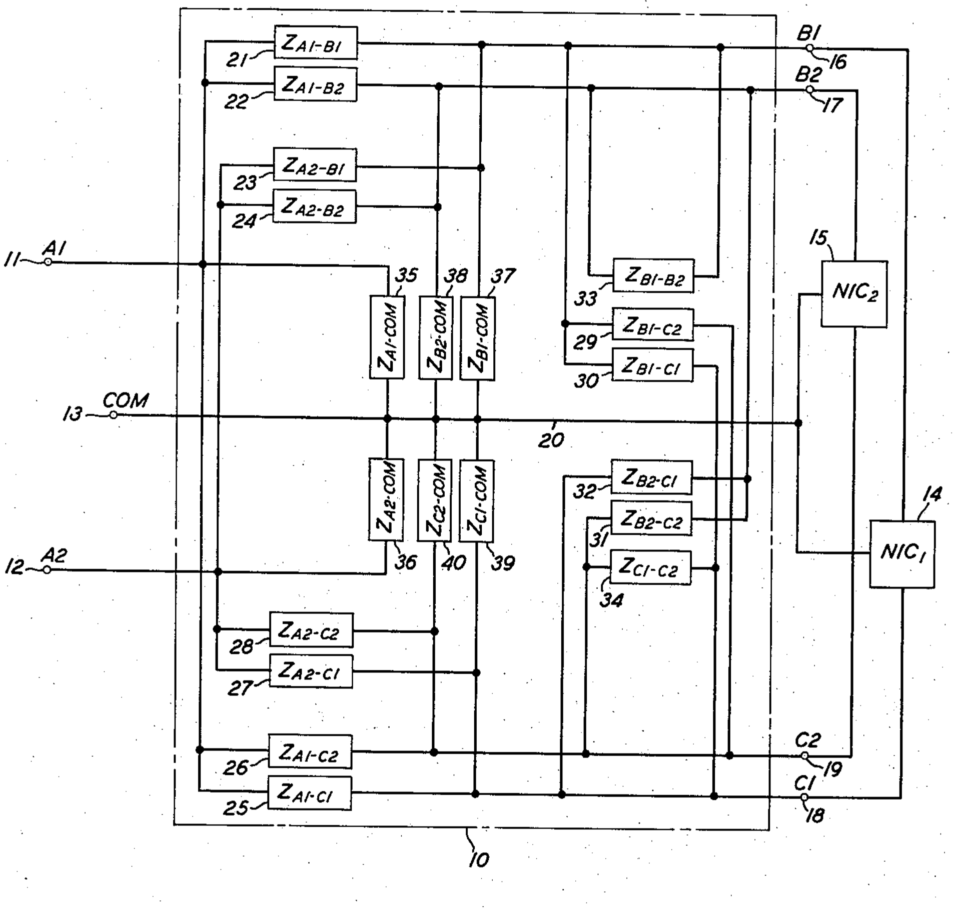
FIG. 1 is a schematic block diagram of a two-port network having a common reference node in accordance with the present invention and including only resistors, capacitors and negative impedance converters.

Referring more particularly to FIG. 1, there is shown a schematic block diagram of a generic two-port network in accordance with the present invention in which the parameters as seen from each of the two ports may be chosen arbitrarily. The network of FIG. 1 provides access to each port between a terminal individual to that port and a common reference terminal.

While a two-port network is illustrated in FIG. 1 for the sake of simplicity, it is to be understood that the invention is not so limited and is, in fact, applicable to any $n$-port network having $(n+1)$ external terminals one of which is a common reference terminal for all the other terminals.

The network of FIG. 1 comprises a subnetwork 10, within the dashed rectangle, which includes only resistive and capacitive elements. Subnetwork 10 has, in general, $(3n+1)$ terminals, $(n+1)$ of which comprise the individual external terminals of the over-all network. Thus terminals 11, 12 and 13 in FIG. 1 comprise the individual external terminals of the over-all two-port network, where terminal 13 is common to all other terminals. Another $n$ of the $(3n+1)$ terminals of a generalized subnetwork 10 provide access to the inputs of $n$ three-terminal negative impedance converters, such as negative impedance converters 14 and 15 in FIG. 1, and are designated by reference numerals 16 and 17. Another $n$ of the $(3n+1)$ terminals of a generalized subnetwork 10 provide access to the outputs of the $n$ negative impedance converters and are designated in FIG. 1 by reference numerals 18 and 19. The common terminals of the negative impedance converters 14 and 15 are connected to reference terminal 13 by way of common bus 20.

It can be seen that, in accordance with the present invention, an $n$-port unbalanced network with a common reference node may be synthesized with arbitrarily chosen parameters and including no inductors by interconnecting no more than $n$ negative impedance converters and the $n$ external terminals with a subnetwork such as subnetwork 10 including only resistors and capacitors. In the general case, subnetwork 10 includes $(4n^2+2n)$ two-terminal impedances each of which includes only resistors and capacitors. These individual impedances are connected as follows: An impedance is connected between each of input terminals 11 and 12 and the input of each of negative impedance converters 14 and 15. Thus impedances 21 and 22 connect terminal 11 (A1) to the inputs of negative impedance converters 14 and 15, respectively, and impedances 23 and 24 connect terminal 12 (A2) to the same respective negative impedance converter inputs.

Similarly, a two-terminal impedance is connected between each of input terminals 11 and 12 and the output of each of negative impedance converters 14 and 15. Thus impedances 25 and 26 connect terminal 11 (A1) to the outputs of negative impedance converters 14 and 15, respectively, and impedances 27 and 28 connect terminal 12 (A2) to the same respective negative impedance converter outputs.

Subnetwork 10 also includes $n^2$ additional two-terminal impedances 29, 30, 31 and 32 which also include only resistors and capacitors and which connect each of terminals 16 and 17 to each of terminals 18 and 19. In addition, another $$\frac{n^2-n}{2}$$

impedances connect each of the second $n$ terminals (16 and 17) to each other of the second $n$ terminals (impedance 33 connects terminal 16 to terminal 17), and yet another $$\frac{n^2-n}{2}$$

impedances connect each of the third $n$ terminals (18 and 19) to each other of the third $n$ terminals (impedance 34 connects terminal 18 to terminal 19).

Finally, another $3n$ impedances are used to connect each of the $3n$ terminals (11, 12, 16, 17, 18 and 19) to the common reference terminal. Thus impedances 35 and 36 connect terminals 11 and 12, respectively, to common terminal 13; impedances 37 and 38 connect terminals 16 and 17, respectively, to terminal 13; and impedances 39 and 40 connect terminals 18 and 19, respectively, to terminal 13.

In accordance with the present invention, a network of the form shown in FIG. 1 can be realized for synthesizing any possible combination of parameters at the $n$ external ports formed between $n$ external terminals and a reference terminal. Thus, for example, filter structures having different transfer functions for the opposite directions of transmission may be synthesized and, moreover, may be synthesized with any arbitrary input and output impedances. The present invention is therefore universally applicable for synthesizing network parameters without the use of inductors.

Furthermore, the two-port network illustrated in FIG. 1 is merely illustrative. A network having any possible number of ports and hence any possible number of prescribed parameters may be constructed in accordance with the present invention using the same general form as employed in FIG. 1. In the most general case, two-terminal impedances without inductors are connected between all possible pairs of terminals and between each terminal and the common reference terminal.

Figure 2A:
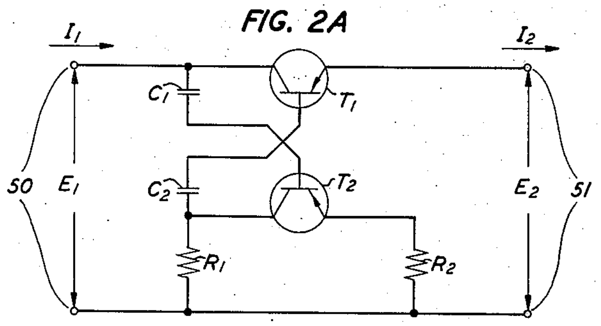
FIGS. 2A and 2B are circuit diagrams of two different types of negative impedance converters suitable for use in the network of FIG. 1.
Figure 2B:
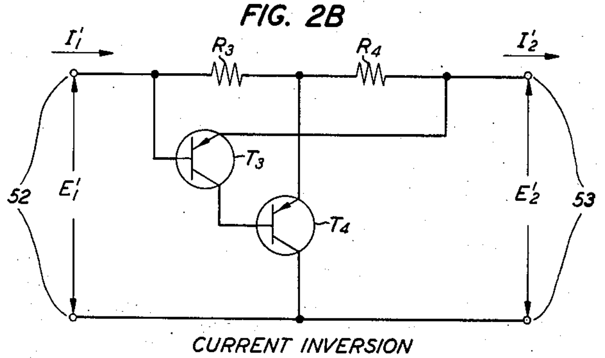

Referring then to FIGS. 2A and 2B, there are shown two examples of negative impedance converters suitable for use in the network of FIG. 1. Numerous other arrangements are known in the art and would be equally suitable.

A negative impedance converter is an active network in which the driving-point impedance at one pair of terminals is equal to the negative of the impedance connected across the other pair of terminals, that is, $Z_{in}=-Z_{out}$. There are two common ways of obtaining this relationship. The first involves allowing current to pass through the network unchanged while the voltage at one terminal pair is inverted with respect to that at the other terminal pair. This arrangement is termed a voltage inversion negative-impedance converter and is illustrated in FIG. 2A. The second way of obtaining this relationship involves constraining the voltages at both terminal pairs to remain the same while the current at one terminal pair is inverted with respect to that at the other terminal pair. This second arrangement is termed a current inversion negative impedance converter and is illustrated in FIG. 2B.

Referring more particularly to FIG. 2A, there is shown a voltage inversion negative impedance converter comprising a network having two terminal pairs 50 and 51 and including transistors $T_1$ and $T_2$, resistors $R_1$ and $R_2$ and blocking capacitors $C_1$ and $C_2$. The emitter-collector path of transistor $T_1$ is connected between the upper terminals of the two terminal pairs. The emitter of transistor $T_2$ is connected through resistor $R_2$ to the common lower terminals 51 and 52 while the collector of transistor $T_2$ is connected through resistor $R_1$ to the same common lower terminals. The base of transistor $T_1$ is connected through capacitor $C_2$ to the junction of resistor $R_1$ and the collector of transistor $T_2$. The base of transistor $T_2$ is connected through capacitor $C_1$ to the upper terminal of terminal pair 50.

$C_1$ and $C_2$ are direct current blocking capacitors having negligible impedance at the operating frequencies of the circuit of FIG. 2A. Biasing circuits have been omitted for the purposes of simplicity. The circuit operates as follows:

Transistor $T_1$, by means of its base connection, is biased to its conducting condition and draws $\alpha_1$ times as much current into terminals 50 as leaves terminals 51. If $\alpha_1$ is close to unity, $I_1$ is substantially equal to $I_2$. Transistor $T_2$ acts as a phase inverter to invert the voltage at one terminal pair and present this inverted voltage across the other terminal pair. The ratio $R_1/R_2$ is approximately the voltage conversion ratio and may be set equal to unity.

In FIG. 2B there is shown a current-inversion negative-impedance converter which comprises a network having two terminal pairs 52 and 53 and including transistors $T_3$ and $T_4$ and resistors $R_3$ and $R_4$. Resistors $R_3$ and $R_4$ are connected in series between the upper terminals of the two-terminal pairs. The emitter-collector path of transistor $T_4$ is connected between the junction of resistors $R_3$ and $R_4$ and the common lower terminals. The base-emitter path of transistor $T_2$ connects the upper terminals of the two-terminal pairs and thus shunts resistors $R_3$ and $R_4$. The collector of transistor $T_3$ is connected to the base of transistor $T_4$. This circuit operates as follows:

The base-emitter path of transistor $T_3$ forms a low impedance connection between the two upper terminals and hence these terminals are maintained at substantially equal voltages. The current in this base-emitter path of transistor $T_3$ controls the collector current of transistor $T_4$ such that the current drawn from terminals 53 is equal and opposite to the current drawn from terminals 52. Since terminals 52 and 53 are at essentially the same potential, the ratio of the two currents is controlled approximately by the ratio $R_3/R_4$. This ratio may be selected so that $I_1'$ and $I_2'$ are equal.

The negative-impedance converters shown in FIGS. 2A and 2B are merely illustrative of the many different types of negative-impedance converters shown in the art. Other, more sophisticated circuit forms may be used equally well and may, in fact, provide additional advantages such as stability, compensation for non-ideal parameters, and so forth. These and other negative-impedance converters are discussed more fully in an article by A. I. Larky entitled "Negative-Impedance Converters" and appearing at pages 124 through 131 of the I.R.E. Transactions on Circuit Theory, volume CT-4, Number 3, September 1957.

Figure 3A:
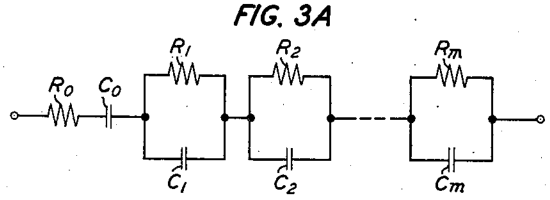
FIGS. 3A and 3B are circuit diagrams of two forms of generalized two-terminal resistance-capacitance networks suitable for use in the network of FIG. 1.

In FIG. 3A there is shown a two-terminal resistive-capacitive (RC) network which, with proper choices of resistances and capacitances, will generate any impedance possible to generate with only resistances and capacitances. The network of FIG. 3A is the so-called "First Foster Form" and comprises a series resistance, a series capacitance, and $m$ parallel resistance-capacitance sections connected in series.

Figure 3B:
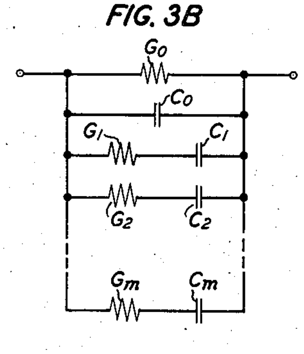

FIG. 3B illustrates another two-terminal resistance-capacitance network which will also generate any possible RC impedance. This network is the so-called "Second Foster Form" and comprises a resistor and a capacitor in parallel with $m$ series resistive-capacitive sections. The networks of FIGS. 3A and 3B are more fully discussed and analyzed in the text Synthesis of Passive Networks by A. E. Guillemin, Wiley and Sons, 1957, and will not be discussed further here except to note that many other network forms could also be used for this purpose.

Returning to FIG. 1, it is possible to analyze this network mathematically most conveniently by means of matrix techniques. The generalized $(3n+1)$ terminal subnetwork 10 can be characterized in terms of its external behavior at the $(3n+1)$ terminals, that is, in terms of the relationships between the $3n$ voltages and $3n$ currents appearing at the ports between these terminals and the common reference terminal. For this purpose, it is convenient to define an admittance matrix $\hat{Y}$ such that $$I=\hat{Y}E \quad (1)$$

where I and E are the column vectors of currents and voltages, respectively, at the various ports of subnetwork 10. The matrix $\hat{Y}$ is a $3n$ by $3n$ short-circuit admittance matrix relating I and E and having a total $9n^2$ terms. Each of these terms may be written as a rational function of $s$, where $s$ is the complex frequency variable $(s=j\omega)$, where $\omega$ is the radian frequency variable.

Each diagonal term in the $3n$ by $3n$ admittance matrix $\hat{Y}$ is the short-circuit driving-point admittance between one of the ports formed between $3n$ terminals and the reference terminal. Similarly, each off-diagonal term in the matrix $\hat{Y}$ is the short-circuit transfer admittance between two of the $3n$ ports thus formed. More specifically, the term in the $i$th row and the $j$th column of the matrix $\hat{Y}$ is the short-circuit transfer admittance between the ports formed by terminals $i$ and $j$ and the reference terminal. Hence the admittance matrix $\hat{Y}$ completely specifies subnetwork 10 and can be directly related to the individual impedances within subnetwork 10.

Thus in a generalized structure similar to FIG. 1, the first $n$ of the $(3n+1)$ terminals of subnetwork 10 would be labeled A1, A2 . . . AN and would comprise the external terminals; the second $n$ of the $(3n+1)$ terminals would be labeled B1, B2 . . . BN and would comprise the inputs to negative impedance converters; and the third $n$ of the $(3n+1)$ terminals would be labeled C1, C2 . . . CN and would comprise the outputs of negative-impedance converters. The remaining terminal is labeled COM and comprises the common reference terminal for all of the other terminals of subnetwork 10.

Each of the two-terminal impedances within subnetwork 10 is labeled with two subscripts identifying the particular pair of the $(3n+1)$ terminals between which it is connected. These two-terminal impedances can therefore be directly identified with corresponding terms in the matrix $\hat{Y}$ and, indeed, can be designed to provide the short-circuit driving-point and transfer admittances expressed in the terms of $\hat{Y}$.

It is, furthermore, convenient to partition the $9n^2$ terms of the matrix $\hat{Y}$ into nine $n$ by $n$ submatrices as follows:

$$\hat{Y}=\left[\begin{array}{c|c|c} Y_{AA} & Y_{AB} & Y_{AC} \\ \hline Y_{BA} & Y_{BB} & Y_{BC} \\ \hline Y_{CA} & Y_{CB} & Y_{CC} \end{array}\right] \quad (2)$$

where each of the terms in the matrix is itself a matrix having $n^2$ terms. $Y_{AA}$, for example, contains the $n^2$ terms appearing in the first $n$ columns and first $n$ rows of $\hat{Y}$ and hence expresses all of the relations between the currents and voltages at terminals A1, A2 . . . AN when all other terminals are short-circuited to reference terminal COM. Similarly, $Y_{AB}$ also has $n^2$ terms and expresses all of the transfer relations between the currents and voltages at terminals A1, A2 . . . AN and B1, B2 . . . BN when all other terminals are short-circuited to reference terminal COM.

Returning to the synthesis technique, an admittance matrix Y, representing the relationships of the currents and voltages at the $n$ external ports formed between terminals A1, A2 . . . AN, and the reference terminal COM, and hence representing the desired over-all properties of the network, may be expressed as follows:

$$Y=Y_{AA}+(Y_{AB}-Y_{AC}B)[AY_{CC}B-Y_{BB}-AY_{CB}+Y_{CB}{}^{t}B]^{-1}(Y_{AB}{}^{t}+AY_{AC}{}^{t}) \quad (3)$$

where $Y_{AA}$, $Y_{AB}$, $Y_{AC}$, $Y_{CC}$, $Y_{BB}$ and $Y_{CB}$ are defined in Equation 2, the superscript $t$ indicates matrix transposition, and A and B are each an $n$ by $n$ coefficient matrix, A representing the conversion constants between the currents at terminals B1, B2 . . . BN and currents at terminals C1, C2 . . . CN, as provided by the negative-impedance converters, and B representing the conversion constants between the voltages at terminals C1, C2 . . . CN and the voltages at terminals B1, B2 . . . BN, as provided by the negative-impedance converters. The discussion can be simplified by assuming that all of the negative impedance converters are identical and hence the matrices A and B are given by $$A=aU;\ B=bU \quad (4)$$

where U is the identity matrix of order $n$ and $ab>0$. The negative-impedance converters can therefore be realized with current-inversion circuits $(a=1,\ b>0)$ or voltage inversion circuits $(b=-1,\ a<0)$.

It will be noted that the matrix $\hat{Y}$ is symmetrical and hence the submatrices $Y_{BA}$, $Y_{CA}$ and $Y_{CB}$ are uniquely related to $Y_{AB}$, $Y_{AC}$ and $Y_{BC}$. That is, once $Y_{AB}$, $Y_{AC}$ and $Y_{BC}$ are determined, $Y_{BA}$, $Y_{CA}$ and $Y_{CB}$ may be obtained merely by interchanging respective rows and columns. In accordance with the present invention, each of these submatrices will be chosen to (1) realize any desired Y, and (2) to render $\hat{Y}$ realizable with only resistors and capacitors.

It will be further noted that the matrix Y represents the admittance of the entire network of FIG. 1, including subnetwork 10 and negative impedance converters 14 and 15. That is, Y is the admittance of the entire circuit as seen from terminals 11, 12 and 13. The matrix $\hat{Y}$, on the other hand, is the admittance of only subnetwork 10. That is, $\hat{Y}$ is the admittance as seen from terminals 11, 12, 13, 16, 17, 18 and 19. The synthesis technique involves constructing $\hat{Y}$ so as to provide a desired Y.

An admittance matrix of the form of $\hat{Y}$ can be expressed in the following partial fraction form:

$$\hat{Y}=sK_{\infty}+\sum_{m=0}^{N}K_{m}\left(\frac{s}{s+\gamma_{m}}\right) \quad (5)$$

where $s$ is the complex frequency variable, $\gamma_m$ in every term is a non-negative real number, where $0=\gamma_1\gamma_2 \ldots \gamma_m$, and $K_\infty$ and $K_m$ represent $3n$ by $3n$ coefficient matrices of real constants. For simplicity, it is assumed that $\hat{Y}$ does not have a pole at infinity $(K_\infty=0)$.

A necessary and sufficient condition for the realizability of the $(3n+1)$ terminal subnetwork 10 characterized by $\hat{Y}$ with only resistors and capacitors is that each of the matrices $K_m$ have nonpositive off-diagonal elements and satisfy the so-called "dominant-diagonal condition." That is, each diagonal term in each of these matrices must be no less than the sum of the magnitudes of all of the off-diagonal terms in the row in which the diagonal term appears, that is, $$m_{jj} \geq \sum_{k \neq j} |m_{jk}| \qquad (6)$$

A general method for synthesizing resistance-capacitance networks whose admittance matrices satisfy the dominant-diagonal condition is discussed in a paper by P. Slepian and L. Weinberg entitled "Synthesis Applications of Paramount and Dominant Matrices" appearing at pages 611 through 630 in the Proceedings of the National Electronics Conference, October 1958, and hence will not be discussed in detail here.

In order to synthesize $\hat{Y}$ with a network including only resistances and capacitances, it is therefore sufficient to satisfy Equation 3 such that $\hat{Y}$ when expressed in the form of Equation 5 yields nonpositive off-diagonal terms in the matrices $K_m$ and satisfies Equation 6.

It is assumed, of course, that Y, the desired and arbitrarily chosen admittance matrix for the over-all network, is expressed as a matrix of $n^2$ real rational functions in $s$. This involves no loss of generality since, as is well known, the desired parameters can be expressed to as close an approximation as desired merely by increasing the degree of these polynomials.

It is then necessary to factor Y so as to obtain a common denominator D, which is also a polynomial in $s$, such that $$Y = \frac{1}{D}[m_{ij}] = \frac{1}{D}N_{ij} \qquad (7)$$

where $N_{ij}$ is an $n$ by $n$ matrix of polynomials in $s$.

The submatrix $Y_{AA}$ can also be expressed as an $n$ by $n$ matrix in ratios of polynomials in $s$ such that $$Y_{AA} = \frac{1}{q}[x_{ij}] = \frac{1}{q}X_{AA} \qquad (8)$$

where $q$ is another common denominator polynomial in $s$ having only distinct negative-real zeros and $X_{AA}$ is an $n$ by $n$ matrix of polynomials in $s$.

The next step is to express the following submatrices of $\hat{Y}$ in terms of Equations 7 and 8:

$$Y_{AB} = \frac{1}{q}X_{AB}$$

$$Y_{AC} = \frac{1}{q}X_{AC} \qquad (9)$$

With this nomenclature, Equation 3 may be rewritten as $$\frac{D}{q}(X^t_{AB} + aX^t_{AC})[qN_{ij} - DX_{AA}]^{-1}(X_{AB} - bX_{AC}) = abY_{CC} - Y_{BB} - aY_{CB} + bY^t_{CB} \qquad (10)$$

It is convenient to define two $n$ by $n$ matrices of polynomials $P_1$ and $P_2$ such that $$P = P_1P_2 = [qN_{ij} - DX_{AA}] \qquad (11)$$

It is necessary to choose $Y_{AA}$ such that (1) Its coefficient matrices as defined by Equation 5 satisfy the dominant diagonal condition with inequality, that is, the diagonal elements are greater than the sums of the off-diagonal terms in the corresponding rows. One simple way of assuring this result is to choose $Y_{AA}$ such that it has only diagonal terms (all off-diagonal terms being zero); and (2) The term $[qN_{ij} - DX_{AA}]$ can be written as the product $P_1P_2$ such that the remaining submatrices are realizable.

These two conditions can always be met by choosing $Y_{AA}$ with only diagonal terms. It will be noted that the factors $P_1$ and $P_2$ can always be obtained if (1) the degree of each diagonal polynomial element in $X_{AA}$ is equal to the degree of $q$, and (2) the degree of $q$ is equal to $n$ times the greater of ($a$) the highest degree in the polynomials of $N_{ij}$, or ($b$) the degree of D, that is, Deg.$q=n$ Max.[Max.Deg.$N_{ij}$; Deg.$D$].

A method for obtaining the factors $P_1$ and $P_2$ from P when this condition obtains is shown in an article by the present applicant entitled "Synthesis of N-Port Active RC Networks" appearing at pages 329 through 347 of The Bell System Technical Journal, volume 40, Number 1, January 1961.

The further condition must also be met, that the determinant of $P_2$ has only distinct negative-real zeros that are different from the zeros of $q$, and that $P_1$ be of the same degree as $q$.

It is next convenient to let the remaining terms on the left hand side of Equation 10 be given by the following:

$$X_{AB} - bX_{AC} = \frac{1}{\beta_1}P_1$$

$$X^t_{AB} + aX^t_{AC} = \frac{1}{\beta_2}P_3 \qquad (12)$$

where $\beta_1$ and $\beta_2$ are non-zero real parameters to be chosen as described below and $P_1$, $P_2$ and $P_3$ are non-singular $n$ by $n$ matrices of polynomials in $s$, $P_1$ and $P_2$ are as defined in Equation 11, and $P_3$ is a matrix chosen so that each term in $$\frac{1}{q}P_3$$

is a negative RC driving point admittance function that is non-zero at the origin and finite at infinity. Solving Equations 12 for $Y_{AB}$ and $Y_{AC}$:

$$Y_{AB} = \frac{1}{q}\frac{b}{\beta_2(a+b)}\left[P_3^t + \frac{a\beta_2}{b\beta_1}P_1\right]$$

$$Y_{AC} = \frac{1}{q}\frac{b}{\beta_2(a+b)}\left[P_3^t = \frac{\beta_2}{\beta_1}P_1\right] \qquad (13)$$

It will be noted that $$\left|\frac{\beta_2}{\beta_1}\right|$$

can be chosen sufficiently small that each term in $Y_{AB}$ and $Y_{AC}$ is a negative-RC driving-point admittance function. Furthermore, this ratio can be held invarient while $\beta_2$ is chosen sufficiently large to satisfy the dominant-diagonal condition in the first $n$ rows of $\hat{Y}$.

Equations 11 and 12 can be substituted in Equation 10 to give $$\frac{1}{\beta_1\beta_2}\frac{D}{q}P_3P_2^{-1} = abY_{CC} - Y_{BB} - aY_{CB} + bY^t_{CB} \qquad (14)$$

The left hand side of Equation 14 is regular at infinity and hence can be written as $$\sum_{m=0}^{M}F_m\frac{s}{s+\gamma_m} = \sum_{m=0}^{M}G_m\frac{s}{s+\gamma_m} - \sum_{m=0}^{M}H_m\frac{s}{s+\gamma_m} \qquad (15)$$

where the $F_m$ are real and, in general, nonsymmetric coefficient matrices, $0=\gamma_0<\gamma_1<\gamma_2< \ldots <\gamma_m$, and the elements in $G_m$ and $H_m$ are non-negative.

It is clear from Equation 14 that the asymmetry in $F_m$ must be absorbed by the off-diagonal terms $-aY_{CB}$ and $bY_{CB}^t$. Equating the corresponding antisymmetric parts, $$\frac{b+a}{2}[Y^t_{CB} - Y_{CB}] = \frac{1}{2}\sum_m\frac{s}{s+\gamma_m}[G_m - G_m^t - H_m + H_m^t] \qquad (16)$$

One convenient solution of Equation 16 is $$Y_{CB} = -\frac{1}{a+b}\sum_m\frac{s}{s+\gamma_m}[G_m + H_m^t] \qquad (17)$$

Proceeding in the same fashion with the symmetric portions of Equations 14 and 15, there is obtained $$Y_{CC} \overset{OD}{=} -\frac{1}{b(a+b)}\sum_m\frac{s}{s+\gamma_m}[H_m + H_m^t]$$

$$Y_{CC} \overset{D}{=} \frac{1}{a(a+b)}\sum_m \frac{s}{s+\gamma_m}[G_m+G_m^t]+\sum_m \frac{s}{s+\gamma_m}J_m$$

$$Y_{BB} \overset{OD}{=} -\frac{b}{a+b}\sum_m \frac{s}{s+\gamma_m}[G_m+G_m^t]$$

$$Y_{BB} \overset{D}{=} \frac{a}{a+b}\sum_m \frac{s}{s+\gamma_m}[H_m+H_m^t]+ab\sum_m \frac{s}{s+\gamma_m}J_m \quad (18)$$

where the "OD" and "D" over the equal signs indicate that the equality holds true only for the off-diagonal and diagonal terms, respectively, and the diagonal matrices $J_m$ are chosen to satisfy the dominant diagonal condition in the last $2n$ rows of $\hat{Y}$.

For the special case where all of the $F_m$ are symmetric matrices, that is, the desired matrix Y is symmetric, the structure is greatly simplified by letting $Y_{CB}=0$ and Equations 18 can be replaced by $$Y_{CC} \overset{OD}{=} -\frac{1}{ab}\sum_m H_m \frac{s}{s+\gamma_m}$$

$$Y_{CC} \overset{D}{=} \frac{1}{ab}\sum_m G_m \frac{s}{s+\gamma_m}+\sum_m J_m \frac{s}{s+\gamma_m}$$

$$Y_{BB} \overset{OD}{=} \sum_m G_m \frac{s}{s+\gamma_m}$$

$$Y_{BB} \overset{D}{=} \sum_m H_m \frac{s}{s+\gamma_m}+ab\sum_m J_m \frac{s}{s+\gamma_m} \quad (19)$$

It will be noted that the matrix Y, representing the over-all network parameters for the network of FIG. 1, may be arbitrarily prescribed in all of its elements. Thus, in accordance with the present invention, it is possible to synthesize any conceivable network parameters by means of a $(3n+1)$ terminal unbalanced subnetwork including only resistors and capacitors, and $n$ negative impedance converters.

It is apparent that there are many degrees of freedom in choosing the elements of $\hat{Y}$ over and above the requirements of Equations 8, 9, 13, 18 and 19. This freedom may be utilized for other desirable purposes such as reducing the sensitivity of the over-all parameters to changes, for example, in the conversion factors of the negative impedance converters.

In order that the synthesis technique may be more readily understood, there will now be described the technique for synthesizing the complete two-port network shown in FIG. 4.

Figure 4:
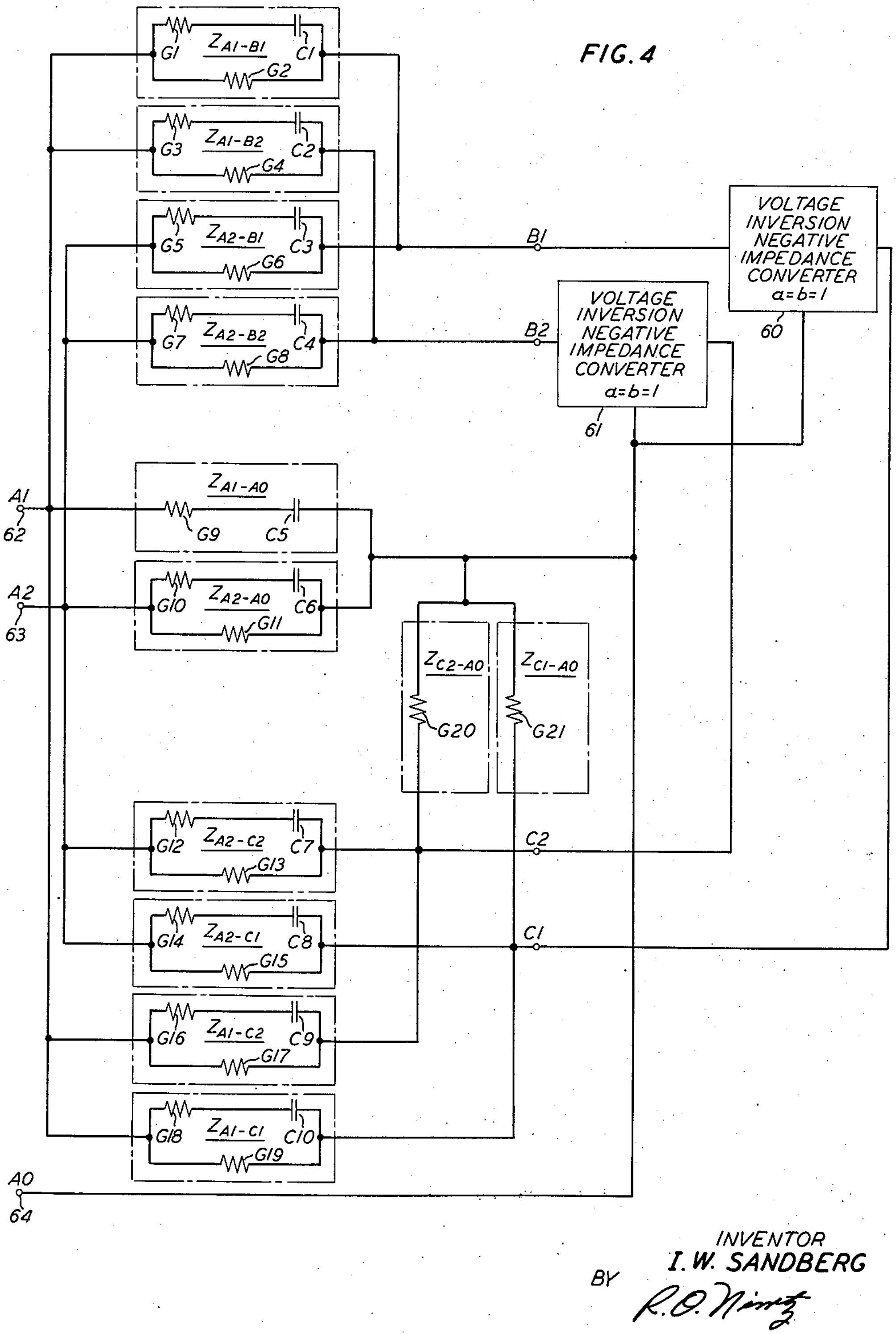
FIG. 4 is a circuit diagram of a specific two-port network constructed in accordance with the present invention.

For simplicity, it is assumed that the conversion factors of the negative impedance converters 60 and 61 in FIG. 4 are each unity, that is, $a=b=1$. Let the desired overall properties at the two external ports provided between terminals 62 and 63 and common terminal 64 be represented by the following matrix:

$$Y=\frac{1}{s+3}\begin{bmatrix}1 & (s+3)\\ (s-3) & 2\end{bmatrix} \quad (20)$$

This expression for Y has been chosen because of the simplification of the mathematics thereby obtaining. In a more general network, each of the terms could be a polynomial in $s$ of any degree. It is to be noted, however, that Equation 20 specifies a network of a type not heretofore realizable without the use of inductors, with unbalanced networks, and with negative impedance converters. This network has the following interesting properties: (1) the transmission from terminal 63 to terminal 62 is completely independent of frequency; (2) the transmission from terminal 62 to terminal 63 provides zero change in amplitude with frequency, but a selected change in phase with frequency; and (3) the driving-point impedances at each of terminals 62 and 63 are inductive and resistive.

To perform the synthesis, it is first necessary to choose $Y_{AA}$ to satisfy the dominant-diagonal condition with inequality and, furthermore, to permit the factoring of P into $P_1$ and $P_2$. By letting $q=D$, the factorization is trivial and the following matrices result:

$$Y_{AA}=\frac{1}{s+3}\begin{bmatrix}10(s+1) & 0\\ 0 & 10(s+2)\end{bmatrix} \quad (21)$$

and $$P_1=(s+3)U;\ P_2=\begin{bmatrix}-(10s+9) & (s+3)\\ (s=3) & -(10s+18)\end{bmatrix} \quad (22)$$

From the determinant of $P_2$ it can be determined that the zeros of the partial fraction expansion of $\hat{Y}$ according to Equation 5 are $\gamma_0=0$, $\gamma_1=1.0000$, $\gamma_2=1.7273$ and $\gamma_3=3.0000$.

Since $P_1$ is a diagonal matrix, $P_3$ can also be chosen to be a diagonal matrix, that is, $$P_3=-(s+2)U \quad (23)$$

Using Equations 13 and 23, values of $$\frac{\beta_2}{\beta_1}$$

can be determined for which $Y_{AB}$ and $Y_{AC}$ are matrices of negative-RC driving-point admittance. With $$\frac{\beta_2}{\beta_1}=0.5$$

there is obtained:

$$Y_{AB}=\frac{1}{\beta_2}\begin{bmatrix}-0.0833 & 0.0000\\ 0.0000 & -0.0833\end{bmatrix}+\frac{s}{(s+3)\beta_2}\begin{bmatrix}-0.1666 & 0.0000\\ 0.0000 & -0.1666\end{bmatrix}$$

$$Y_{AC}=\frac{1}{\beta_2}\begin{bmatrix}-0.5833 & 0.0000\\ 0.0000 & -0.5833\end{bmatrix}+\frac{s}{(s+3)\beta_2}\begin{bmatrix}-0.1666 & 0.0000\\ 0.0000 & -0.1666\end{bmatrix} \quad (24)$$

and, from Equation 21

$$Y_{AA}=\begin{bmatrix}3.3333 & 0.0000\\ 0.0000 & 6.6666\end{bmatrix}+\frac{s}{s+3}\begin{bmatrix}6.6666 & 0.0000\\ 0.0000 & 3.3333\end{bmatrix} \quad (25)$$

The choice of $\beta_2=0.02(\beta_1=0.4)$ satisfies the dominant diagonal condition for the first two rows of $K_0$ and $K_3$.

From Equations 14 and 15 there is obtained $$\sum_{m=0}^{2} F_m\frac{s}{s+\gamma_m}=\frac{0.1263(s+2)}{(s+1.0000)(s+1.7237)}\begin{bmatrix}(10s+18) & (s+3)\\ (s-3) & (10s+9)\end{bmatrix}$$

$$=\begin{bmatrix}2.6316 & 0.4386\\ -0.4386 & 1.3159\end{bmatrix}+\frac{s}{s+1.000}\begin{bmatrix}-1.3889 & -0.3889\\ 0.6944 & 0.17361\end{bmatrix}+\frac{s}{s+1.7273}\begin{bmatrix}0.0199 & 0.0348\\ -0.1296 & -0.2267\end{bmatrix} \quad (26)$$

and hence $$G_0=\begin{bmatrix}2.6315 & 0.4386\\ 0.0000 & 1.3159\end{bmatrix} H_0=\begin{bmatrix}0.0000 & 0.0000\\ 0.4386 & 0.0000\end{bmatrix}$$

From Equations 17 and 19

$$Y_{CB_0}=\begin{bmatrix}-1.3157 & -0.4386\\ 0.0000 & -0.6579\end{bmatrix}$$

$$Y_{CC_0}=\begin{bmatrix}2.6315+j_{10} & -0.2193\\ -0.2193 & 1.3159+j_{20}\end{bmatrix}$$

$$Y_{BB_0}=\begin{bmatrix}j_{10} & -0.2193\\ -0.2193 & j_{20}\end{bmatrix} \quad (27)$$

where $j_{10}$ and $j_{20}$ are the diagonal elements in $J_0$ in Equations 19. With the choice of $j_{10}=2.2534$ and $j_{20}=2.4725$, the dominant diagonal condition is satisfied in the last four rows of $K_0$ to give $$K_0=\left[\begin{array}{cc|cc|cc} 3.3333 & 0.0000 & -0.4166 & 0.0000 & 2.9166 & 0.0000 \\ 0.0000 & 6.6666 & 0.0000 & -0.4166 & 0.0000 & -2.9166 \\ \hline -0.4166 & 0.0000 & 2.2534 & -0.2193 & -1.3157 & 0.0000 \\ 0.0000 & -0.4166 & -0.2193 & 2.4725 & -0.4386 & -0.6579 \\ \hline -2.9166 & 0.0000 & -1.3157 & -0.4386 & 4.8849 & -0.2139 \\ 0.0000 & -2.9166 & 0.0000 & -0.6579 & -0.2139 & 3.7884 \end{array}\right] \quad (28)$$

The remaining coefficient matrices $K_1$, $K_2$ and $K_3$ can be constructed in a similar manner. From these matrices, the realization of the matrix $\hat{Y}$ is straightforward. It will be noted, however, that a large number of elements are required to realize $\hat{Y}$. This number can be significantly reduced by a proper choice of $P_3$.

Thus, for example, if $P_3$ is chosen such that $P_3=P_2$ and $P_2$ is adjusted such that $$P_3=P_2=\begin{bmatrix} -(19s+21) & -(8s+12) \\ -(9s+12) & -(9s+15) \end{bmatrix} \quad (29)$$

and $$P_1=\begin{bmatrix} (s+3) & -(s+3) \\ -(s+3) & 2(s+3) \end{bmatrix} \quad (30)$$

with $$\frac{\beta_2}{\beta_1}=1$$

Equations 13 provide $$Y_{AB}=\frac{1}{\beta_2}\begin{bmatrix} -3.0 & -2.5 \\ -2.5 & -1.5 \end{bmatrix}+\frac{s}{\beta_2(s+3)}\begin{bmatrix} -6.0 & -2.5 \\ -2.0 & -2.0 \end{bmatrix}$$

$$Y_{AC}=\frac{1}{\beta_2}\begin{bmatrix} -4.0 & -1.5 \\ -1.5 & -3.5 \end{bmatrix}+\frac{s}{\beta_2(s+3)}\begin{bmatrix} -6.0 & -2.5 \\ -2.0 & -2.0 \end{bmatrix} \quad (31)$$

and, as before, $$Y_{AA}=\begin{bmatrix} 3.3333 & 0.0000 \\ 0.0000 & 6.6666 \end{bmatrix}+\frac{s}{s+3}\begin{bmatrix} 6.6666 & 0.0000 \\ 0.0000 & 3.3333 \end{bmatrix} \quad (32)$$

The choice of $\beta_2=3.3000$ satisfies the dominant-diagonal condition in the first and second rows of $K_0$ and $K_1$.

Equation 14 therefore reduces to $$\frac{1}{\beta_1\beta_2}\frac{D}{q}P_3P_2^{-1}=0.0918U \quad (33)$$

where U is the identity matrix of order two.

From Equations 17 and 19

$$Y_{CC}=\begin{bmatrix} 0.0918+j_{10} & 0.0000 \\ 0.0000 & 0.0918+j_{20} \end{bmatrix}+\frac{s}{s+3}\begin{bmatrix} j_{11} & 0 \\ 0 & j_{21} \end{bmatrix}$$

$$Y_{BB}=\begin{bmatrix} j_{10} & 0 \\ 0 & j_{20} \end{bmatrix}+\frac{s}{s+3}\begin{bmatrix} j_{11} & 0 \\ 0 & j_{21} \end{bmatrix}$$

$$Y_{CB}=0 \quad (34)$$

Choosing the elements of $J_0$ such that $j_{10}=1.6667$ and $j_{20}=1.4233$, the following coefficient matrix is obtained:

$$K_0=\left[\begin{array}{cc|cc|cc} 3.3333 & 0.0000 & -0.9091 & -0.7576 & -1.2121 & -0.4545 \\ 0.0000 & 6.6666 & -0.7576 & -0.4545 & -0.4545 & -1.0606 \\ \hline -0.9091 & -0.7576 & 1.6667 & 0.0000 & 0.0000 & 0.0000 \\ -0.7576 & -0.4545 & 0.0000 & 1.4233 & 0.0000 & 0.0000 \\ \hline -1.2121 & -0.4545 & 0.0000 & 0.0000 & 1.7585 & 0.0000 \\ -0.4545 & -1.0606 & 0.0000 & 0.0000 & 0.0000 & 1.5151 \end{array}\right] \quad (35)$$

Similarly, choosing the elements of $J_1$, such that $j_{11}=2.4243$ and $j_{21}=1.3637$, $$K_1=\left[\begin{array}{cc|cc|cc} 6.6666 & 0.0000 & -1.8182 & -0.7576 & -1.8182 & -0.7576 \\ 0.0000 & 3.3333 & -0.6061 & -0.6061 & -0.6061 & -0.6061 \\ \hline -1.8182 & -0.6061 & 2.4243 & 0.0000 & 0.0000 & 0.0000 \\ -0.7576 & -0.6061 & 0.0000 & 1.3637 & 0.0000 & 0.0000 \\ \hline -1.8182 & -0.6061 & 0.0000 & 0.0000 & 2.4243 & 0.0000 \\ -0.7576 & -0.6061 & 0.0000 & 0.0000 & 0.0000 & 1.3637 \end{array}\right] \quad (36)$$

The circuit of FIG. 4 may readily be constructed by means of the coefficient matrices in Equations 35 and 36 by utilizing the techniques described in the afore-mentioned article by Slepian and Weinberg. The values of the individual components are given below, with conductances expressed in mhos and capacitances in farads.

| | | | |
|---|---|---|---|
| $G_1$ | 1.8182 | $G_{17}$ | 0.7576 |
| $G_2$ | 0.9091 | $G_{18}$ | 1.8182 |
| $G_3$ | 0.7576 | $G_{19}$ | 1.2121 |
| $G_4$ | 0.4545 | $G_{20}$ | 0.2112 |
| $G_5$ | 0.6061 | $G_{21}$ | 0.0918 |
| $G_6$ | 0.7576 | | |
| $G_7$ | 0.6061 | $C_1$ | 0.6061 |
| $G_8$ | 1.0606 | $C_2$ | 0.2525 |
| $G_9$ | 1.5151 | $C_3$ | 0.2020 |
| $G_{10}$ | 0.9089 | $C_4$ | 0.2020 |
| $G_{11}$ | 3.9394 | $C_5$ | 0.5050 |
| $G_{12}$ | 0.6061 | $C_6$ | 0.3030 |
| $G_{13}$ | 0.4545 | $C_7$ | 0.2020 |
| $G_{14}$ | 0.6061 | $C_8$ | 0.2020 |
| $G_{15}$ | 0.4545 | $C_9$ | 0.2525 |
| $G_{16}$ | 0.7576 | $C_{10}$ | 0.6061 |

It is to be understood that the above-described arrangements are merely illustrative of the numerous and varied other arrangements which might comprise applications of the principles of the invention. Such other arrangements may readily be devised by those skilled in the art without departing from the spirit and scope of this invention.

What is claimed is:

1. A signal tranmission network having $n$ ports, where $n$ is greater than one, and comprising at least $n$ three-terminal negative impedance converters and a $(3n+1)$ terminal passive network including only resistors and capacitors, a first $n$ of said $(3n+1)$ terminals, together with a separate common reference terminal, comprising said $n$ ports, means for connecting a second $n$ of said $(3n+1)$ terminals each to one terminal of a corresponding one of said $n$ negative impedance converters, means for connecting the remaining $n$ of said $(3n+1)$ terminals each to another terminal of the corresponding one of said $n$ negative impedance converters, and means for connecting the remaining terminals of said negative impedance converters to said common reference terminal.

2. The signal transmission network according to claim 1 wherein said $(3n+1)$ terminal passive network includes a plurality of two-terminal passive impedances each including only resistors and capacitors, means for connecting one of said impedances between each of said $(3n+1)$ terminals and each other of said $(3n+1)$ terminals.

3. An unbalanced signal transmission network having $n$ terminals and a common reference terminal, said network comprising $n$ negative impedance converters, and circuit means including at least $(4n^2+2n)$ two-terminal impedances interconnecting said $n$ terminals, said reference terminal and said $n$ negative impedance converters, said two-terminal impedances each comprising only resistors and capacitors.

4. A signal transmission network comprising $n$ external terminals, a common reference terminal, $n$ negative impedance converters, an impedance including only resistors and capacitors connecting each of said $n$ external terminals to the inputs of each of said negative impedance converters, an impedance including only resistors and capacitors connecting each of said $n$ external terminals to the outputs of each of said negative impedance converters, an impedance including only resistors and capacitors connecting each of the inputs of said negative impedance converters to each of the outputs of said negative impedance converters, an impedance including only resistors and capacitors connecting each of said $n$ external terminals, each of the inputs and each of the outputs of said negative impedance converters to said common reference terminal.

5. An unbalance active signal transmission network comprising $(n+1)$ external terminals and exhibiting $n^2$ arbitrarily chosen parameters collectively at all of said external terminals, at least $n$ negative impedance converters, and a $(3n+1)$ terminal passive transducer including only resistors and capacitors interconnecting said external terminals and said negative impedance converters, said $(3n+1)$ terminal passive transducer being constructed to realize said $n^2$ arbitrarily chosen parameters at said $(n+1)$ external terminals.

6. The signal transmission network according to claim 5 wherein said negative impedance converters are of the voltage inversion type.

7. The signal transmission network according to claim 5 wherein said negative impedance converters are of the current inversion type.

8. In combination, a passive unbalanced network having $(3n+1)$ terminals and including only resistors and capacitors, means for connecting a negative impedance converter between each of a first $n$ of said $3n$ terminals and a corresponding terminal of a second $n$ of said $3n$ terminals, utilization means, and means for connecting said utilization means to the remaining $n$ of said $3n$ terminals.

9. The combination according to claim 8 wherein said passive network includes a plurality of two-terminal impedances each including only resistors and capacitors, means for connecting one of said impedances between each of said first $n$ terminals and each of said remaining $n$ terminals, means for connecting one of said impedances between each of said second $n$ terminals and each of said remaining $n$ terminals, and means for connecting one of said impedances between each of said first $n$ terminals and each of said second $n$ terminals.

10. The combination according to claim 9 including a further plurality of two-terminal impedances each including only resistors and capacitors, means for connecting one of said further plurality of impedances between at least some of said $3n$ terminals and the remaining common reference terminal.

11. A signal transmission network having $n$ ports, where $n$ is an integer greater than one, which comprises at least $n$ negative impedance converters, a $3n$-port subnetwork including only resistors and capacitors, and means connecting each of said $n$ negative impedance converters between a respective one of a first $n$ of said $3n$ ports and a corresponding one of a second $n$ of said $3n$ ports, the remaining $n$ ports of said subnetwork comprising the $n$ ports of said signal transmission network.

No references cited.